US006848030B2

United States Patent
Tokar et al.

(10) Patent No.: US 6,848,030 B2
(45) Date of Patent: Jan. 25, 2005

(54) METHOD AND APPARATUS FOR FILLING LINES IN A CACHE

(75) Inventors: Yakov Tokar, Ashdod (IL); Amit Gur, Even-Yehuda (IL); Jacob Efrat, Kfar-Saba (IL); Doron Schupper, Rechovot (IL)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 09/909,562

(22) Filed: Jul. 20, 2001

(65) Prior Publication Data

US 2003/0018853 A1 Jan. 23, 2003

(51) Int. Cl.[7] .............................................. G06F 12/00
(52) U.S. Cl. ...................... 711/137; 711/118; 712/207
(58) Field of Search ................................ 711/118, 137; 712/205–207

(56) References Cited

U.S. PATENT DOCUMENTS 5,623,608 A * 4/1997 Ng ............................. 711/137
5,649,144 A * 7/1997 Gostin et al. ................ 711/220
5,845,101 A   12/1998 Johnson et al. ............. 712/207
6,085,261 A    7/2000 McIntyre, Jr. et al. ........ 710/35
6,138,212 A * 10/2000 Chiacchia et al. ........... 711/137
6,219,760 B1 * 4/2001 McMinn ..................... 711/137
6,233,656 B1 * 5/2001 Jones et al. ................. 711/137

FOREIGN PATENT DOCUMENTS

WO        WO 99/23564      5/1999      ........... G06F/12/08

* cited by examiner

Primary Examiner—Nasser Moazzami
(74) Attorney, Agent, or Firm—James L. Clingan, Jr.

(57) ABSTRACT

A processing system has a processor, a cache, and a fetch unit. If there is a miss in the cache, the fetch unit generates a fetch address for the miss in the cache for the purpose of retrieving the requested data from external memory and providing the data to the processor and loading the data in a location in a line in the cache. The fetch unit also generates additional prefetch addresses for addresses consecutive with the fetch address. The prefetch addresses continue to be generated for all of the locations in the line in the cache that are consecutive with the fetch address. The generation of prefetch addresses will be stopped if another requests arrives that is not part of the already generated prefetched addresses. Further, the outstanding prefetches will be terminated if the external memory can handle such termination.

7 Claims, 2 Drawing Sheets

METHOD AND APPARATUS FOR FILLING LINES IN A CACHE

FIELD OF THE INVENTION

This invention relates to cache memories, and more particularly to filling lines in a cache memory.

BACKGROUND OF THE INVENTION

Caches are frequently used in processing systems to improve the performance of the processing system. The cache is for providing very fast data in response to requests by the processor. Performance improves as the cache has more data that the processor wants. When it does have what the processor wants this is commonly called a hit. When it does not, it is commonly called a miss. Thus, a high hit rate is desirable. The better hit rate is achieved by having the cache contain the data that the processor is currently seeking. The processor sends out an address wanting the data at that address. The processor then sends out another address. The most likely address for the next address is one that is consecutive with the preceding one. Thus, one technique that has developed is to fetch not just the data at the requested address in the case of a miss but also data at consecutive addresses, which is called prefetching. The cache is filled with the data at the requested addresses, then the data is supplied to the processor. This is adequate if only a few additional addresses are prefetched.

Thus, there is a need for a technique to handle prefetches for a cache in a manner that more efficiently handles the prefetching for populating the cache and servicing the processor.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DESCRIPTION OF THE INVENTION

Described herein is an embodiment which provides a way to populate a cache line in a cache while providing needed service to a processor. The cache is populated with data from a prefetch. The prefetch is performed as a result of a miss in the cache. The processor is provided with requested data as soon as it has arrived. If during a prefetch, the processor generates a request that is a miss and is not part of the prefetch, the prefetching terminated. If during the prefetch, the processor generates a request that is a miss but is for one of the prefetched addresses, the prefetching continues.

Figure 1:
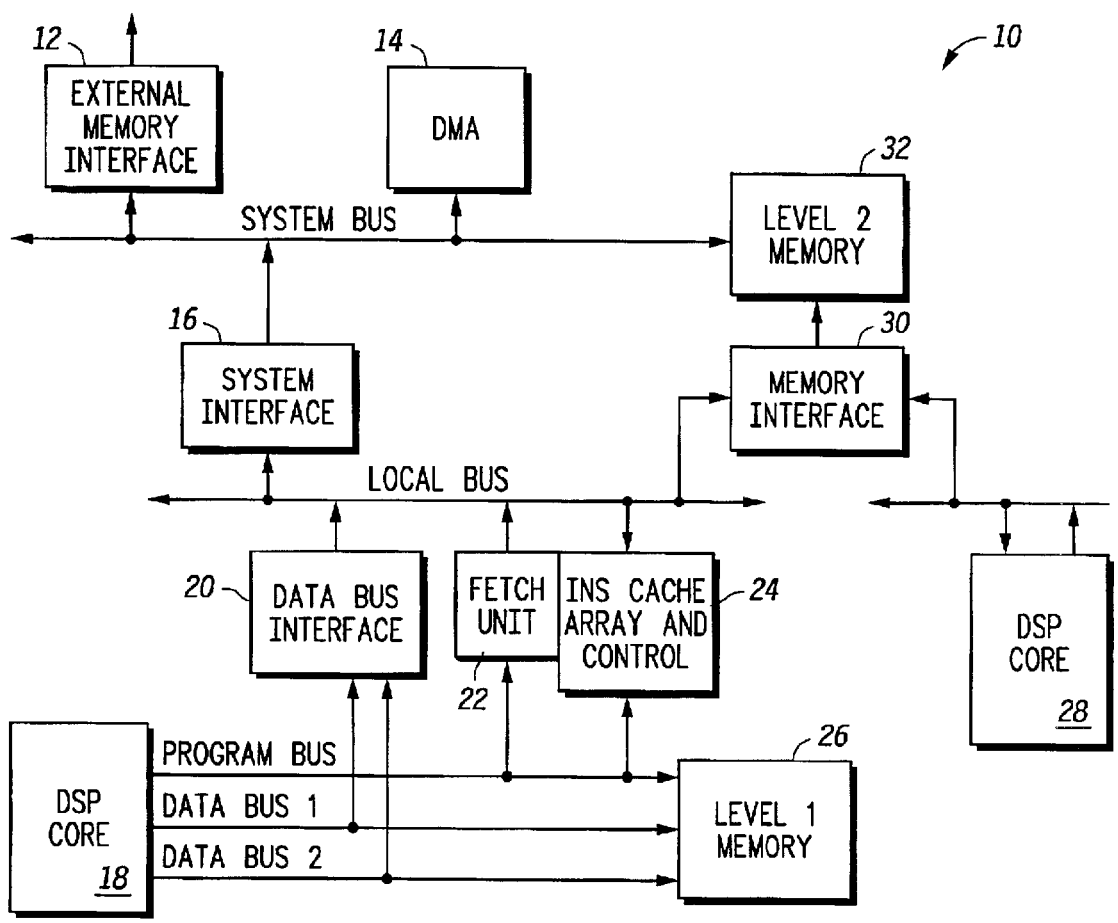
FIG. 1 is a block diagram of processing system according to an embodiment of the invention.

Shown in FIG. 1 is a processing system 10 comprising an external memory interface 12, a direct memory access circuit (DMA) 14, a system interface 16, a DSP core 18, a data bus interface 20, a fetch unit 22, a cache 24, a level 1 memory 26, a DSP core 28, a memory interface 30, and a level 2 memory 32. DSP core 18 operates with level 1 memory 26 via a bus having a program bus, a data bus 1, and a data bus 2. DSP core 18 operates with data bus interface 20 via data bus 1 and data bus 2 and with fetch unit 22 and cache 24 via the program bus. Data bus interface 20, fetch unit 22, cache 24, system interface 16, and memory interface 30 are coupled to a local bus. External memory interface 12, system interface 16, DMA 14, and Level 2 memory 32 are coupled to a system bus. Memory interface 30 and level 2 memory 32 are coupled to each other.

DSP core 18 initiates a request for data by providing an address on the program bus. If the level 1 memory 26 does not have that address, cache 24 determines if there is hit. If there is, cache 24 provides the data. If there is a miss, fetch unit 22 initiates a request for the data and provides the address to system interface 16 and level 2 memory 32 via memory interface 30. If the address is not for level 2 memory 32, system interface 16 passes the address on to external memory interface 12, which in turn passes it on to an external memory (not shown). This address for the data that was missed in the cache is herein called a fetch address. After this fetch address has been sent, fetch unit also initiates additional requests for data at address locations that are consecutive with the fetch address. These addresses are not actually requested at this point in time, so these are called prefetch addresses. The fetch address and the prefetch addresses are all in a single line in the cache and are consecutive addresses. In this particular example, cache 24 has 16 words in a line. A word can be any length and in this case is 128 bits. Thus each fetch and prefetch is for 128 bits of data.

When the data at the fetch address is received from external memory by external memory interface 12, the data is coupled to cache 24 via system interface 16. Similarly, if level 2 memory 32 has the fetch address, level 2 memory provides the data to cache 24 via memory interface 30. In either case, the data is provided onto the local bus where it is simultaneously provided to DSP core 18 on the program bus via fetch unit 22 and loaded into cache 24. With regard to the prefetch addresses, the data is similarly returned to cache 24 via the local bus. Fetch unit 22 sends out prefetch addresses as rapidly as it is possible to do so. At least one constraint on this can include how many pending addresses external memory can receive. The fetch unit tracks the progress by setting a pointer for the fetch address and moves it as the data arrives to keep track of what data has arrived. Similarly, a pointer is set for the prefetch addresses as well. The pointer moves as the prefetch addresses are sent out. Thus, there is pointer for where the first address is, one for the last prefetch address sent out, and one for the location where the latest data was received.

During the time at least some of the prefetch addresses are outstanding, DSP core may make another request. If it is a miss in cache 24, but is for one of the outstanding prefetch addresses, then fetch unit 22 will not attempt to change the fetching that is occurring and will provide the data as it comes in. In the alternative, if the request is a miss and is not for an outstanding prefetch address, then fetch unit 22 terminates the outstanding prefetches and initiates a request for the new request. The address for the new request then becomes the fetch address and new prefetches are initiated. There is then new pointers for the fetch address, the data as it comes in, and the last prefetch address that was sent out.

Figure 2:
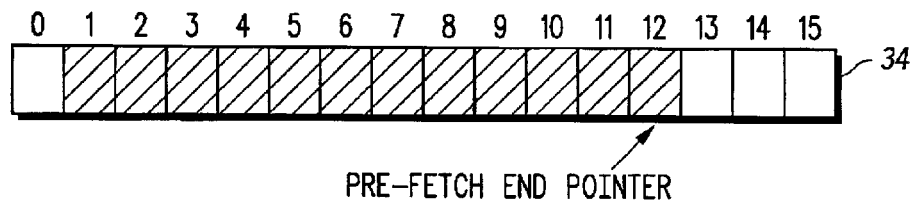
FIGS. 2 and 3 are a diagram of a portion of a line in a cache of FIG. 1.
Figure 3:
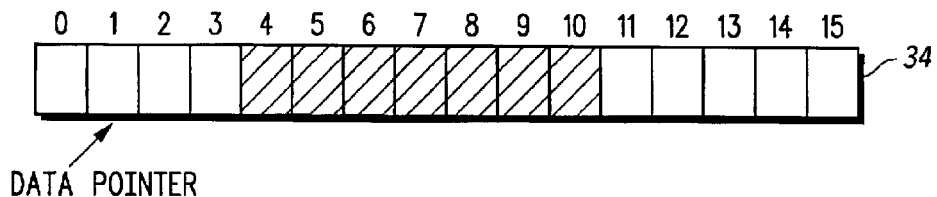

The pointer operation can be seen in FIGS. 2 and 3, which show a line 34 in cache 24. Line 34 has 16 words shown as 0-15. This shows an example in which the prefetch address was word 1. FIG. 2 shows a prefetch end pointer that moves as the prefetch addresses are sent out. The initial setting is at the fetch address and moves as the prefetch addresses are sent out. In this example, the prefetch pointer shows that the address for word 12 was the last prefetch address sent out. Shown in FIG. 3 is the data pointer, which shows that data has been received through word 4.

Figure 4:
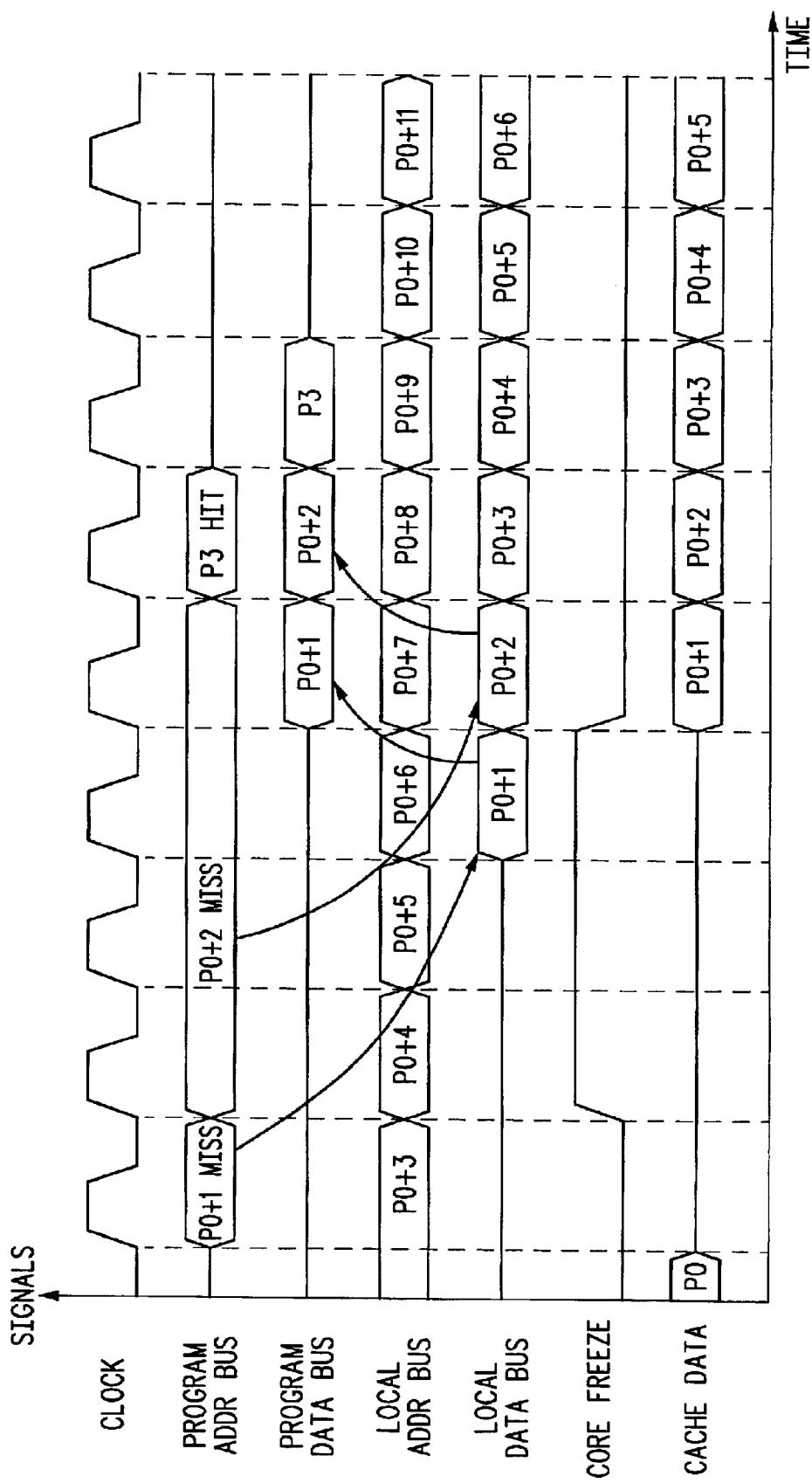
FIG. 4 is a timing diagram useful in understanding the circuit of FIG. 1.

Shown in FIG. 4 is a timing diagram useful in understanding the sequence of operation of a particular example. P0 in FIG. 4 represents the fetch address. In this case DSP core 18 requested address P0, the fetch address, followed by prefetch addresses that are consecutive addresses P0+1, P0+2, P0+3, P0+4, P0+5, P0+6, P0+7, P0+8, P0+9, P0+10, and P0+11. These provided on a local address bus portion of the local bus. The local bus comprises the local address bus and a local data bus. Processing system 10 allows for up to two outstanding requests by DSP core 18. In this example, request for P0+1 occurs just after data for P0 has been received as shown in the cache data. Core freeze is initiated as the request for P0+2 is initiated to indicate that no more requests can be made because there are then two outstanding requests. Core freeze is terminated after the data for P0+1 has arrived. This further shows that the P0+2 request remains pending until after the data for P0+2 has arrived. By the time the request for P0+3 arrives, the data for P0+3 has arrived so that there is then a hit in cache 24. In this case, so long as there were no further requests, the line that P0 is in would be filled from the P0.

This also points out that the priority given for a fetch address is higher than for a prefetch address. This shows that there is a four cycle delay between the data for P0 and P0+1. Whereas, if the prefetch addresses were given the same priority, there would be no cycles between them as shown in between P0+2 and P0+3. This is not an inherent delay, but it does show what can happen. Under other circumstances there may not be any intervening priority such as may arise from servicing DSP core 28, and the data for the prefetch addresses may be arrive immediately following the data for the fetch address.

The situation shown in FIG. 4 is an example of a prefetch hit. The two requests, the requests for P0+1 and P0+2 were misses in the cache, but they were for addresses that were being prefetched. Equipping the DSP core with the data as it arrives is beneficial. DSP core 18 benefited from immediately receiving the data from P0+1 and P0+2. The generation of the request for P0+3 was thus generated prior to all of the data for the prefetch addresses being received. Recognizing the prefetch hit by fetch unit 22 results in the generation signal that indicates that the data has already be requested.

For the case in which the data for the prefetch addresses, the addresses in addition to the address that came from DSP core 18 as a request for data, has note arrived and another request, different from the prefetch addresses, has arrived then there is both a miss in cache 24 and a prefetch miss. This results in fetch unit 22 terminating the outstanding prefetches, which by its nature also prevents the entry of the prefetched data onto the program data bus, but there may be memory types in external memory that do not allow requests for data to be terminated after they have been received. If that is the case, the automatic generation of the prefetch addresses in that sequence is terminated, but the data that is received is loaded in cache 24. This provides for a partial line fill. A line, such as line 34, is then only filled to the extent of the prefetches until the next fetch address that is not also a prefetch address is received. Thus, prefeteched data that is received is stored in the cache without waiting for any previously received prefetched data being placed on the program data bus.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for filling a line in a cache, comprising the steps of:

sending a request for data to be provided on a data bus to the cache at a first address;

sending a first request external to the cache for first data at the first address;

defining a first pointer for the first address;

sending for additional data at additional addresses, the additional addresses being consecutive with the first address;

defining a second pointer for the address of the data that was last sent for;

receiving the first data located at the first address;

placing the first data in the line in the cache and onto the data bus;

loading the additional data into the line in the cache as it is received without waiting for completion of the step of placing the first data in the line in the cache and onto the databus;

defining a third pointer for the address of the data that was last received;

terminating the loading of the additional data in response to a second request for different data that is at a different address from the additional addresses; and sending the second request external to the cache for the different data at the different address.

2. The method of claim 1, further comprising:

continuing loading the additional data into the line in the cache as it is received in response to receiving a data request at one of the additional addresses for data not present in the cache.

3. A processing system comprising:

a cache for storing data and providing a hit signal if a request for data is contained in the cache and a miss signal if the request for data is not contained in the cache;

processor means, coupled to the cache, for sending a request for data to the cache at a first address;

fetch means, coupled to the cache and the processor means, for sending the request external to the cache for first data at a first address in response to the miss signal, sending for additional data at additional addresses, the additional addresses being consecutive with the first address, receiving the first data located at the first address, placing the first data in the cache and onto the data bus, loading the additional data into the line as it is received without waiting for completion of the placing the first data in the cache and onto the data bus, tracking progress of the requests for the data at the additional addresses by setting a first pointer for the first address, a second pointer for the address of the additional addresses that was last sent out, and a third pointer for the address of the additional addresses of the additional data that was last loaded, and terminating the loading of the additional data in response to a second request for different data that is at a different address from the additional addresses.

4. The processing system of claim 3, wherein the fetch means is further characterized as sending the second request external to the cache for the different data at the different address.

5. The processing system 4, wherein the cache is characterized as having plurality of lines that each comprise locations having consecutive addresses, and wherein the additional addresses requested by the fetch means are for locations in the cache chat are in a line in the plurality of lines.

6. The processing system of claim 5, further comprising a system interface coupled to the fetch for interfacing between the fetch means and an external memory.

7. The processing unit of claim 3 wherein the fetch means is further characterized as continuing loading the additional data if a third request is received from the processor means that is a miss in the cache and is for one of the additional addresses.

* * * * *

UNITED STATES PATENT AND TRADEMARK OFFICE
CERTIFICATE OF CORRECTION

PATENT NO. : 6,848,030 B2  Page 1 of 1
APPLICATION NO. : 09/909562
DATED : July 20, 2001
INVENTOR(S) : Yakov Tokar It is certified that error appears in the above-identified patent and that said Letters Patent is hereby corrected as shown below:

In Column 6, Line 15, Claim No. 5:

Change "chat" to --that--

Signed and Sealed this

Third Day of June, 2008

JON W. DUDAS
*Director of the United States Patent and Trademark Office*

UNITED STATES PATENT AND TRADEMARK OFFICE
CERTIFICATE OF CORRECTION

PATENT NO. : 6,848,030 B2  Page 1 of 1
APPLICATION NO. : 09/909562
DATED : January 25, 2005
INVENTOR(S) : Yakov Tokar It is certified that error appears in the above-identified patent and that said Letters Patent is hereby corrected as shown below:

In Column 6, Line 15, Claim No. 5:

Change "chat" to --that--

This certificate supersedes the Certificate of Correction issued June 3, 2008.

Signed and Sealed this

First Day of July, 2008

JON W. DUDAS
*Director of the United States Patent and Trademark Office*